United States Patent [19]

Smith

[11] Patent Number: 5,498,936
[45] Date of Patent: Mar. 12, 1996

[54] POWER SYSTEM WITH SIMPLIFIED, LOW COST SELF-STARTING SELF OSCILLATOR, POWER FACTOR CORRECTION, POWER REGULATION AND OUTPUT OPEN CIRCUIT VOLTAGE REGULATION, OVERLOAD AND SHORT CIRCUIT PROTECTION

[76] Inventor: Jerry J. Smith, 99 Brainard Rd., Westbrook, Conn. 06498

[21] Appl. No.: 414,284

[22] Filed: Mar. 31, 1995

[51] Int. Cl.$^6$ ...................................................... H05B 37/02
[52] U.S. Cl. ........................... 315/247; 315/DIG. 5; 315/DIG. 7; 315/240; 315/307; 315/224; 315/219
[58] Field of Search ....................... 315/247, 307, 315/224, 244, 240, 239, DIG. 7, DIG. 5, 219

[56] References Cited

U.S. PATENT DOCUMENTS 5,412,287  5/1995  Shackle ................... 315/247

Primary Examiner—Robert J. Pascal
Assistant Examiner—Michael Shingleton
Attorney, Agent, or Firm—Brian L. Michaelis

[57] ABSTRACT

A gas discharge lamp power ballast or power supply having simplified power factor correction, simplified automatic short circuit/overload protection and output open circuit voltage regulation. The gas discharge power ballast or power supply includes self-oscillating converter circuitry to which simplified power factor correction is provided via simple passive circuitry that includes a split winding from the power transformer in conjunction with an input storage capacitor and a current limiting resistor. The short circuit/overload protection is implemented, without elaborate current sensing circuitry, by utilizing the drive winding of the power transformer. In a shorted or overloaded state, a capacitor interacting with oscillator circuitry, controls oscillator cycling to reduce current flow and protect the circuitry against the overload at the output. Output open circuit voltage regulation and power regulation are also implemented in a simplified manner without the need for significant additional circuitry. Alternative circuitry for simplified constant current limiting is implemented to further increase the efficiency of the power supply or power ballast. Power factor correction of 95% or more is achieved using minimal components, without requiring a bulky input choke. Simplified short circuit/overload protection, output open circuit voltage regulation and power regulation are provided without significant additional cost. Excellent power regulation is provided against changes in input and output voltages.

18 Claims, 6 Drawing Sheets

POWER SYSTEM WITH SIMPLIFIED, LOW COST SELF-STARTING SELF OSCILLATOR, POWER FACTOR CORRECTION, POWER REGULATION AND OUTPUT OPEN CIRCUIT VOLTAGE REGULATION, OVERLOAD AND SHORT CIRCUIT PROTECTION

FIELD OF THE INVENTION

The present invention relates generally to power supplies, and more particularly to a constant power ballast for supplying power to high intensity gas discharge lamps.

BACKGROUND OF THE INVENTION

Power ballasts are known for providing regulated power to gas discharge tubes or lamps for the purpose of delivering a high voltage for ionizing the gas in the gas discharge tubes, to effect current flow therethrough and the emission of visible light therefrom. Such power ballasts also must provide the required voltage and current to ensure proper operation of the lamps subsequent to initial ionization.

Known solid state power supplies or power ballasts, such as ones described in U.S. Pat. No. 5,097,182 ("the '182 patent"), typically include a power transformer. Current flow through a primary winding of the power transformer is controlled by a power transistor which forms a major component of oscillator circuitry used to drive the load. A voltage sensing circuit is connected to the power transistor to limit the current flowing in the primary winding of the transformer, and is designed to limit current to prevent saturation of the magnetic core of the power transformer.

In the ballasts implemented in the prior art, the input or line voltage is rectified and supplied to a large input filter capacitor (e.g. C1 in the '182 patent). The input filter capacitor delivers energy to the circuit during each cycle when the line voltage falls below its peak value. Disadvantageously, such an input capacitor seriously degrades the power factor of the power supply or ballast. The effect of such a capacitor, as illustrated by FIGS. 1A and 1B herein, is that input current (FIG. 1B) lags the input voltage by a significant amount (in some cases the lag can be as much as 60 degrees). Furthermore, the input current is delivered in the form of input current spikes. It is generally the case that the larger the input capacitor used, the greater the current lag with respect to the input voltage, and the higher the amplitude of the current spikes. Such an input filter capacitor also disadvantageously results in an input surge upon powerup while the capacitor charges.

Power factor correction circuitry is known to be implemented to substantially overcome the degradation of a capacitively filtered A.C. input. U.S. Pat. No. 5,146,398 ("the '398 patent"), discloses circuitry for "active" power factor correction. The power factor correction circuitry used in the '398 patent to improve the ratio of real power to apparent power, includes a frequency and amplitude modulated boost converter that forces the input current to have virtually the same shape as the input voltage. Such active power factor correction as known in the prior art requires the addition of a conventional boost converter circuit that includes a large input choke (L1 in the '398 patent). Disadvantageously, such circuitry including the addition of the input choke, is bulky, takes up significant amounts of space, and is relatively expensive.

Additional circuitry is typically incorporated in known power supplies or power ballasts to effect short circuit, overload or overcurrent protection. Elaborate "failsafe" circuitry, such as described in U.S. Pat. No. 5,075,598, may be implemented and require the addition of sensing circuitry to sense for any unusual increase in current between the power transformer and ground. Disabling circuitry will also be required in a feedback path to the power transistor to disable oscillation and high voltage output. The additional sensing and disabling circuitry can add significant cost to the power supply or ballast. Furthermore, the additional circuitry takes up space which will disadvantageously increase the size and weight of the supply.

SUMMARY OF THE INVENTION

The present invention provides a gas discharge lamp power ballast or power supply having a self-starting self oscillator and simplified power factor correction, simplified power regulation, automatic short circuit/overload protection and open circuit voltage regulation.

According to the invention, a gas discharge power ballast or power supply includes a self-oscillating converter circuit and simplified power factor correction that is provided via an energy storage mechanism that allows the circuit to operate with a large 60 Hz ripple while maintaining output voltage to the lamp load. Power factor correction and optimization is provided using simple passive circuitry that includes a split winding from the power transformer in conjunction with an input storage capacitor and a current limiting resistor. Power factor correction can be optimized for different input voltage ranges by adjusting the ratio of the windings of the split transformer. The self-oscillating converter circuitry includes simplified short circuit/overload protection, open circuit voltage regulation and power regulation. The short circuit/overload protection is implemented, without elaborate current sensing circuitry, by utilizing the drive winding of the power transformer. In a shorted or overloaded state, the drive winding interacting with oscillator circuitry, decreases oscillator frequency which reduces current flow and protects the circuitry against overload at the output. Open circuit voltage regulation and power regulation are also implemented in a simplified manner without the need for significant additional circuitry.

Alternative circuitry for simplified constant current control is implemented to further increase the efficiency of the power supply or power ballast.

Features of the invention include low cost power factor correction of 95% or more using minimal components, without requiring a bulky input choke. Power factor correction circuitry according to the invention also eliminates the need to limit surges in the input current during initial start-up. Simplified short circuit/overload protection, open circuit voltage regulation and power regulation are provided without significant additional cost. Excellent power regulation is provided against changes in input and output voltages.

DESCRIPTION OF THE DRAWING

These and other features and advantages of the invention will be more fully understood from the following detailed description of an illustrative embodiment taken in conjunction with the accompanying drawing, in which.

DETAILED DESCRIPTION

Figure 2:
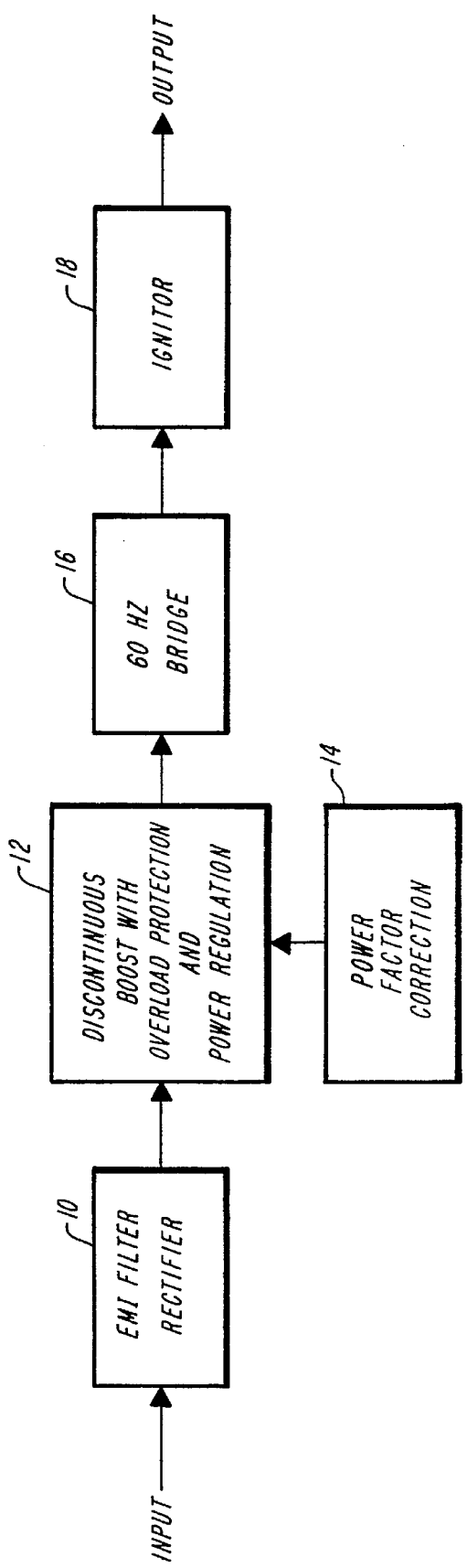
FIG. 2 is a block diagram showing the functional blocks of a power supply or power ballast according to the invention.
Figure 3:
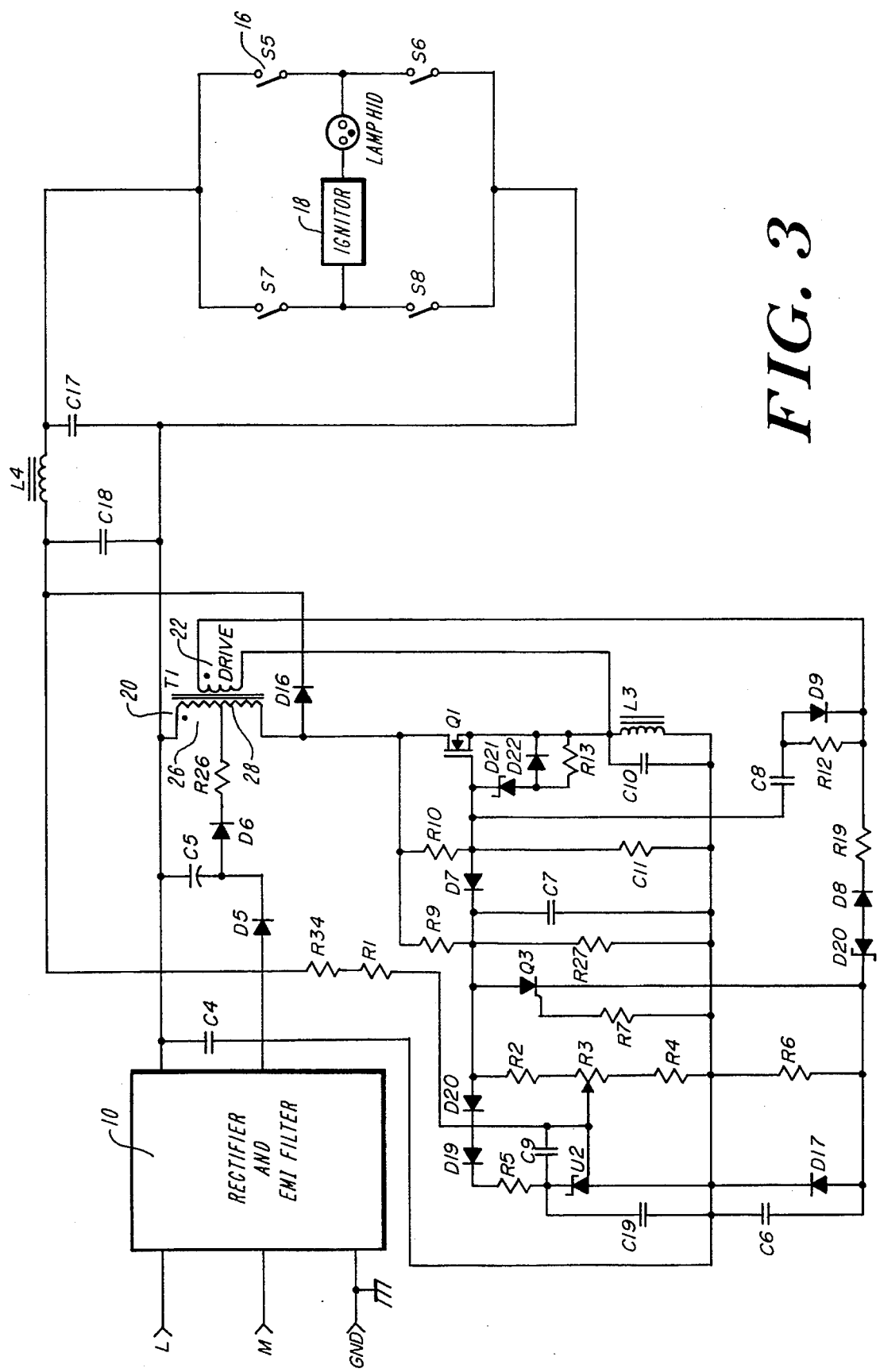
FIG. 3 is a schematic diagram of a high intensity gas discharge power ballast according to the invention.

An illustrative embodiment of a power ballast according to the invention, as illustrated in FIGS. 2 and 3, includes an electromagnetic interference (EMI) filter and rectifier portion 10 as known in the art, which receives the input from a line, such as a 115 V AC, 60 Hz power line. While EMI filters as known in the art are easily applied in the power ballast or power supply according to the invention, it is intended that the EMI filter in a high intensity discharge lamp ballast implementation include a two stage normal mode filter to reduce the pulses of current drawn by oscillator and drive circuitry to acceptable levels. Rectification can be provided by a bridge rectifier as known in the art, in the form of a full wave bridge comprised of diodes rated in accordance with the ballast/power supply input and load considerations.

The filtered/rectified input signal from the EMI filter/rectifier 10 is received by discontinuous boost circuitry 12 that includes a self starting oscillator having overload protection and power regulation. Power factor correction circuitry 14 includes components associated with the self oscillating converter, other components, and a portion of a power transformer. The power factor correction circuitry 14, discussed in detail hereinafter, reduces the input RMS line current and substantially reduces the amount that the input line current lags the input line voltage, and makes the input line current waveform look more like the input line voltage waveform. The power factor corrected self oscillating converter in a power ballast implementation, drives a 60 Hz bridge 16, as known in the art. The bridge 16 issues a square wave output to an ignitor 18, as known in the art, that fires the high intensity discharge lamp.

Self-Oscillating Converter

Figure 4A:
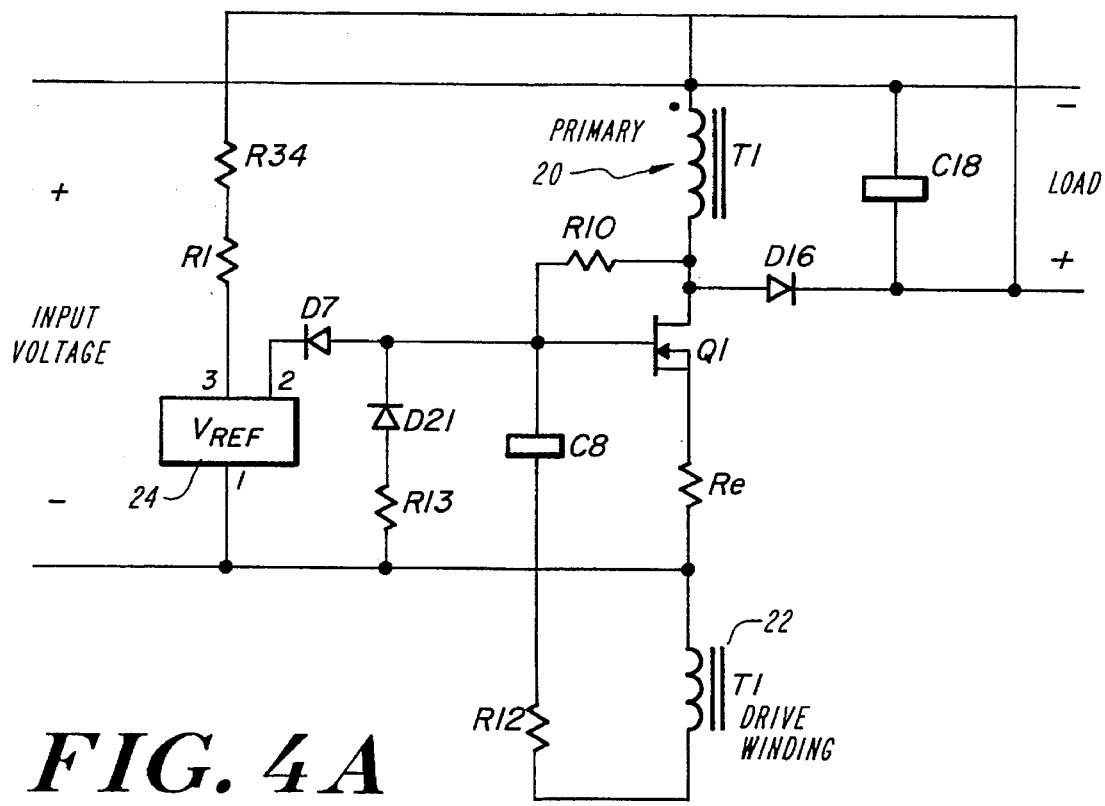
FIG. 4A is a schematic diagram of a self-oscillating converter circuit implementing overload protection and power regulation in a discontinuous boost portion of the power ballast of FIGS. 2 and 3.
Figure 4B:
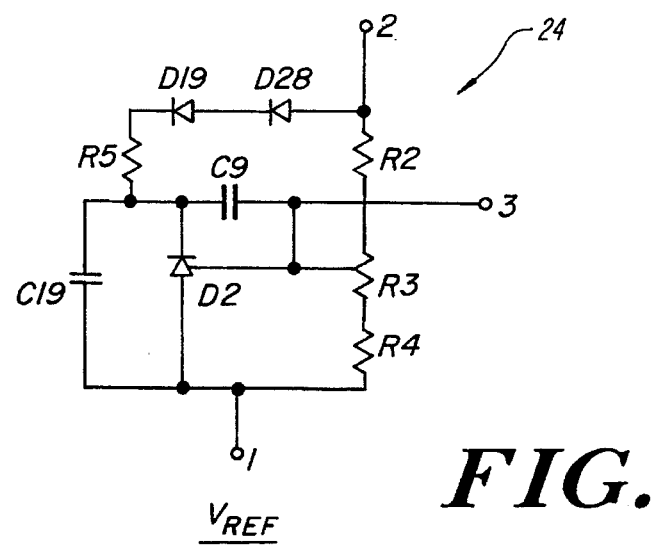
FIG. 4B is a voltage reference portion, Vref, of the self-oscillating converter circuit of FIG. 4A.

Referring now to FIGS. 3, 4A and 4B, the power ballast generally described includes self-starting, self-oscillating converter circuitry (best seen in FIG. 4A). The oscillator is self-starting as a capacitor C8 charges through a resistor R10 to turn on an N channel depletion field effect transistor (FET) Q1. When the voltage at the gate of Q1 reaches a sufficient level, i.e. 3 volts in this illustrative embodiment of a 115 V AC, 100 W ballast, Q1 starts to turn on and the input voltage starts to appear at the primary winding(s) 20 of a power transformer T1, and is reflected onto the drive winding 22 thereof. This voltage reflected onto the drive winding 22 of T1 quickly turns Q1 fully on. The gate of Q1 is clamped by D21 or Vref, whichever is lower in voltage.

Transformer T1 is designed having a tap on the primary winding 20 side, dividing it into a first portion 26 and a second portion 28. The ratio of turns in the first portion 26 and the second portion 28 can be designed to optimize power factor correction. Thus, it will be appreciated that the first portion 26 and second portion 28 of the transformer T1 constitute the primary 20 side of the transformer. It should also be appreciated that for proper operation, the primary and drive windings should be tightly coupled.

"Vref" in FIG. 4A is a reference voltage that is generated by a reference voltage circuit 24, illustrated in FIG. 4B, which is also used in power regulation as discussed in detail hereinafter. The reference voltage circuit is based on a programmable zener, U2, that is a programmable precision reference monolithic IC such as a Motorola TL431, or the like. Such a device is well known in the art and described in the Motorola TL431, A Series Specifications and Applications Information, which is incorporated herein by reference. The three terminal programmable reference U2 is configured in the reference voltage circuit 24 that is incorporated in the self-oscillating converter circuitry, FIG. 4A, so that it senses the input voltage plus the output voltage, and the voltage at the gate of Q1, which is a function of the input voltage.

The increasing current in Q1 in FIG. 4A, creates an increasing voltage across resistor Re. This reduces the gate voltage of Q1 because of the clamping action of D21 or Vref. The reduced gate voltage of Q1 eventually starts to turn Q1 off, which reduces the voltage on the primary and the drive winding of T1 and speeds up the turning off of Q1.

With Q1 turned off, the current that previously flowed through Q1 flows through D16 into C18, providing power to the load. This current decays linearly to zero, during which time C8 is charged by the drive winding 22 through D21, R13 and R12. When the current through D16 reaches zero the voltage on the drive winding 22 collapses and C8 is able to turn on Q1, repeating the cycle. The frequency of oscillation of the self-starting, self-oscillating converter is set by the primary inductance and peak current (See equation 1 hereinafter).

Power Regulation

Proper operation of a high intensity discharge lamp requires that the output power be regulated against changes in the input voltage. Likewise, the output power should be regulated against changes caused by the lamp load itself, such as resulting from changes in temperature or degradation of the gas inside the gas discharge lamp. Normally, the energy to the lamp is delivered, through C18, by the energy stored in T1 according to the following equations:

$$P = \tfrac{1}{2} L i^2 F \qquad \text{Equation \#1}$$

Where "L" is the inductance of the primary side of T1, "I" is the peak current in T1 at the instant Q1 turns off, and F is the frequency of operation. Under normal conditions F is relatively constant. The peak current, with reference now to FIG. 4A, depends on D21 (or Vref) and Re.

$$E = \frac{LI}{t} \quad \text{and} \quad L = \frac{Et}{I} \qquad \text{Equation \#2}$$

Substituting for L in equation 1:

$$P = \frac{EtF}{2} \qquad \text{Equation \#3}$$

Solving for "I":

$$I = \frac{2P}{EtF} \qquad \text{Equation \#4}$$

"t" is the on time of Q1. "F" (the frequency of operation) is the inverse of the period, therefore tF is the on time of Q1 divided by the period, which is the duty cycle (D) of Q1. Thus, $$I = \frac{2P}{ED} \qquad \text{Equation \#5}$$

It can be seen that the duty cycle varies as the instantaneous rectified AC varies such that the instantaneous voltage times the Q1 on time equals the voltage on C18 times the Q1 off time. Therefore, when the instantaneous voltage is 100 and the voltage on C18 is 100, the duty cycle is 0.50 or 50%. If we assume that this is the average input voltage over the complete cycle and if we also assume the power is 110 watts to account for circuit losses, then:

$$I = \frac{220}{(100)(.5)} = 4.40 \text{ Apk} = 1.78 \text{ Arms}$$

An examination of equation (1) shows that output power varies directly with frequency if the inductance and the peak current remain constant. However, if the AC input voltage increases, T1 will charge to a given current level faster but the discharge time into C18 will remain the same. Thus, the total time will reduce or conversely the frequency will increase and consequently the output power will increase.

On the other hand, if the input voltage does not change but the voltage on C18 increases (due to lamp aging or temperature changes) the discharge time into C18 will decrease, again resulting in higher frequency operation and consequently higher power output. Thus, there is a need for power regulation.

U2, and associated components, discussed hereinbefore with reference to FIG. 4B, constitute a regulator that is set via R3 to control the voltage on clamp C7 (of FIG. 3), resulting in the proper output power. U2 also senses the effective sum of the input voltage and the voltage on C18 (output voltage) via R1 and R34 as discussed hereinbefore, such that an increasing input voltage or voltage on C18 lowers the voltage on clamp C7 which lowers the peak current in T1 and provides power regulation by maintaining a constant output power. Similarly, a decreasing input voltage or voltage on C18 raises the voltage on clamp C7 which increases the peak current in T1 and provides power regulation by maintaining a constant output power.

Short Circuit/Overload Protection

Figure 5:
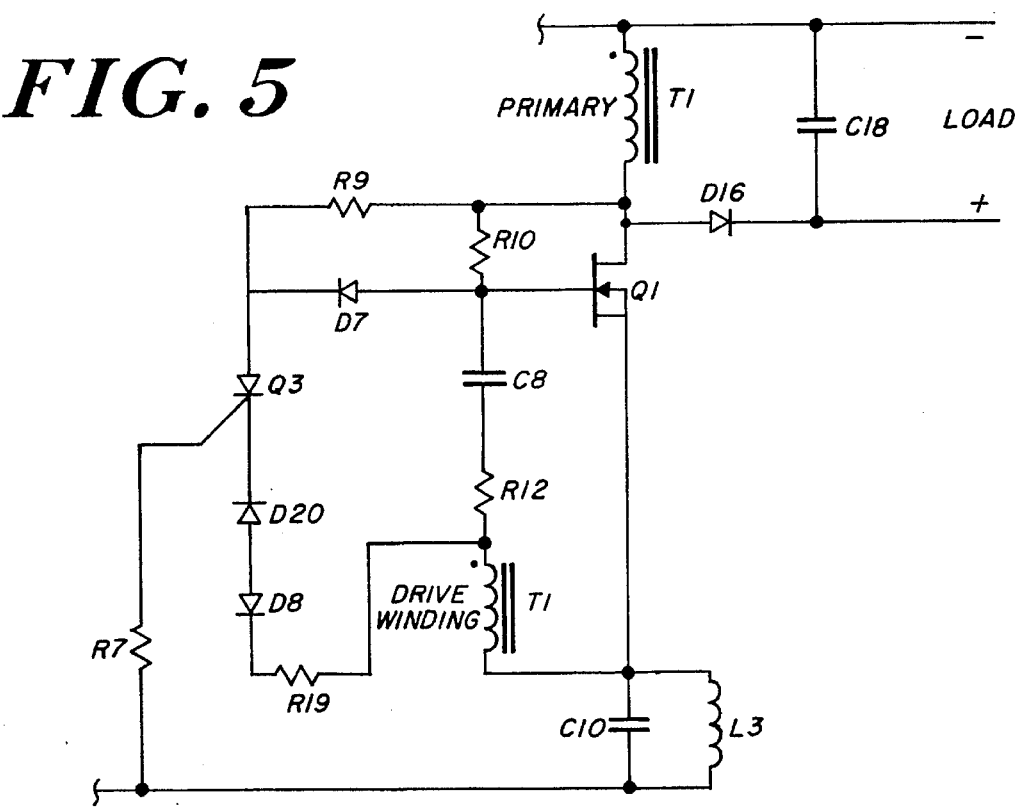
FIG. 5 is a schematic diagram of output overload protection circuitry of the power ballast of FIG. 2.

The self-starting, self-oscillating converter according to the invention, includes simplified circuitry that effects protection in the event of a short circuit or overload at the output. As illustrated in FIG. 5, if the output as presented across C18 is shorted or severely overloaded, the voltage on C18 remains low. The voltage across the drive winding 22 of T1 collapses and during the conduction of D16 is too low to charge C8 to the voltage needed to turn Q1 back on. C8 therefore has to charge up through R10 until the threshold of Q1 is reached and another cycle is initiated. This delays the start of that next cycle and lowers the operating frequency of the circuit. Accordingly, the average current in D16 is reduced, protecting against the overload/short circuit condition. When implementing this overload protection, the delay of the start of the next cycle must be designed to occur at an output voltage of less than the minimum starting voltage of the lamp, to allow the proper starting sequence.

Output Open Circuit Voltage Regulation

Output open circuit voltage regulation is implemented in a simplified manner, and illustrated in FIG. 5 as well. In a lamp ballast embodiment, when no lamp is present the output may rise to a level which could damage the components in the power ballast. When Q1 turns off, the output voltage on C18 is reflected from the primary side of T1 onto the drive winding 22. If this voltage is high enough to turn on zener diode D20, Q3 which is an SCR will conduct, discharging C8 which then has to recharge through R10 which controls the turn on of Q1. As a result, the drive winding and the output are clamped to a safe value and open circuit voltage regulation with low power dissipation is effected.

Power Factor Correction

Figure 1A:
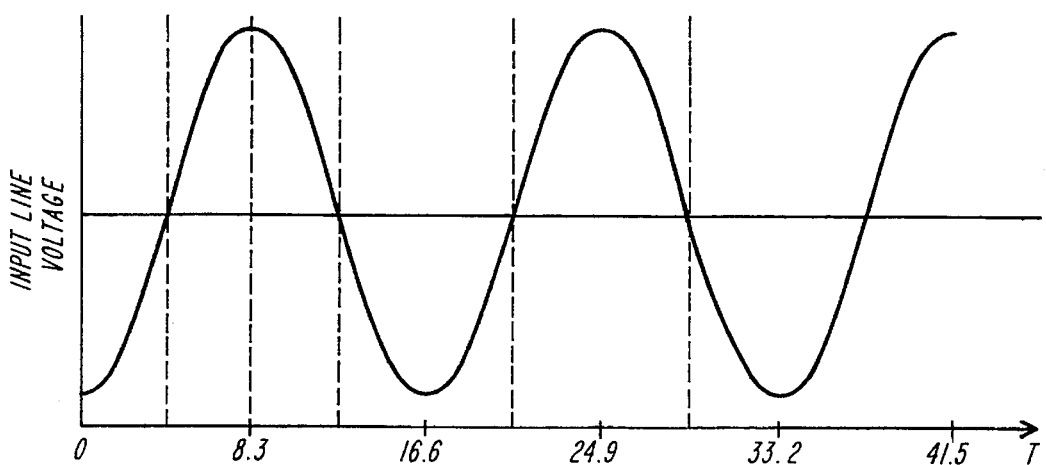
FIGS. 1A, 1B, and 1C are waveform representations of input line voltage, input line current to a power ballast with an input capacitor without power factor correction, and input line current to a power ballast with power factor correction according to the invention, respectively.
Figure 1B:
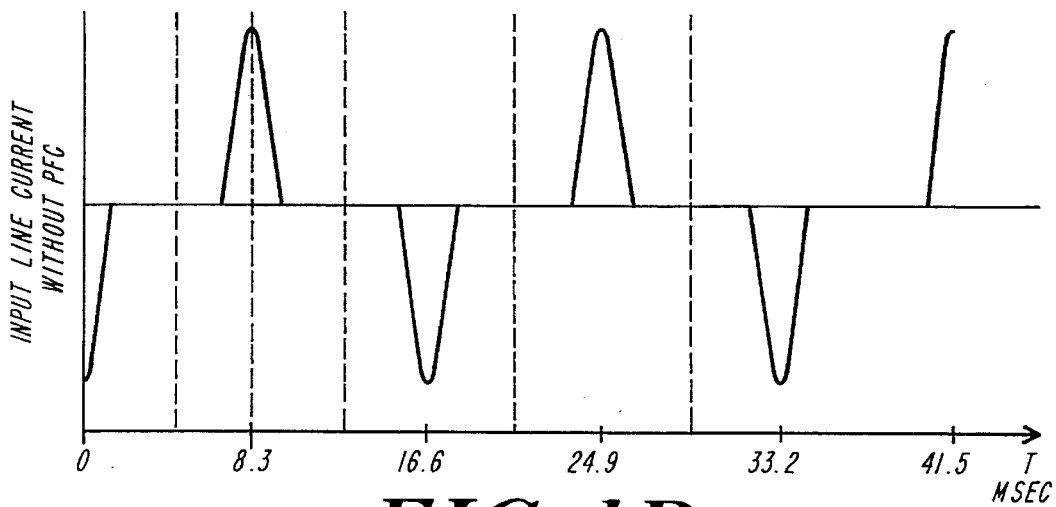
Figure 6:
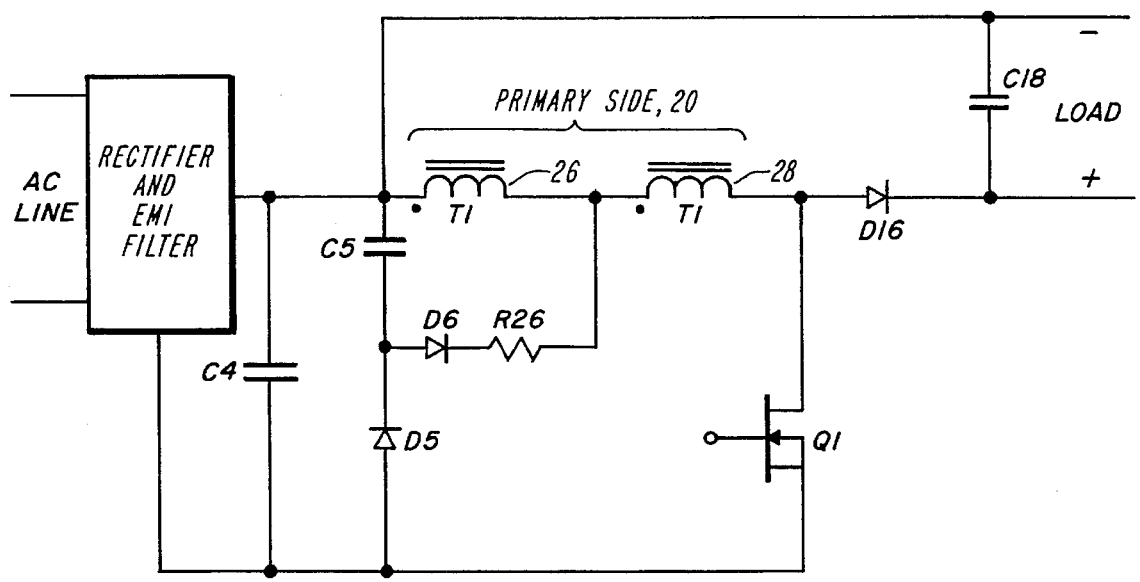
FIG. 6 is a schematic diagram of the power factor correction circuitry of the power ballast of FIG. 2.

Referring now to FIG. 6, power factor correction is implemented via passive circuitry in the ballast/power supply according to the invention. The discontinuous boost circuitry, including the self-starting self oscillator discussed hereinbefore, draws current directly from the input during most of the input cycle. However, as the input voltage goes through zero volts (See FIG. 1A), power can not be drawn from the input by the boost circuit, and in a lamp ballast implementation the lamp will go out unless another source of energy is available. C5 provides energy to the boost circuitry via D5 during low portions of the input cycle. C5 is recharged during the peak portion of the AC input via a tap on the power transformer T1, D6 and the limiting resistor R26. Since the charging current in C5 is limited by R26 and the current limiting circuitry of the oscillator, the need for input current surge (inrush) limiting circuitry to limit input current surges at turn on is eliminated, which results in reduced cost and size.

The capacitor C5 is charged by the rectified, filtered input current and acts as a storage capacitor storing some percentage of the peak energy. The amount of energy stored by storage capacitor C5 is determined by the turns ratio between the first portion 26 and the second portion 28 of the power transformer in that the energy to recharge C5 is drawn through the second portion 28, and C5 is charged to the voltage on the first portion 26 of the transformer T1. Since this is less than the rectified, filtered input line voltage, in accordance with the ratio of the first and second portions 26, 28, C5 is subjected to lower voltage and ripple current stress and therefore can be implemented in a smaller size at lower cost.

The storage capacitor C5 charges through D6, R26, T1 and Q1. R26 limits the peak current in C5 and may be replaced by an inductor in some applications. For 115 Vac operation, T1 is center tapped to charge C5 to about 50% of the peak AC input. Thus, C5 provides energy for the boost circuit when the input is less than 50% of the peak or for about 33% of the time. When the line voltage falls below the voltage on C5, the energy in C5 is transferred to the output through D5 and T1. When the input voltage rises during the succeeding cycle, C5 is recharged through D6, R26, T1 and Q1. By adjusting the ratio of the first portion 26 to the second portion 20 on the primary side, the voltage on C5 can be optimized for different input voltage ranges. Further, a small, preferably 1 microfarad input capacitor (C4 in FIGS. 3 and 6), can be used as an input filter capacitor.

Figure 1C:
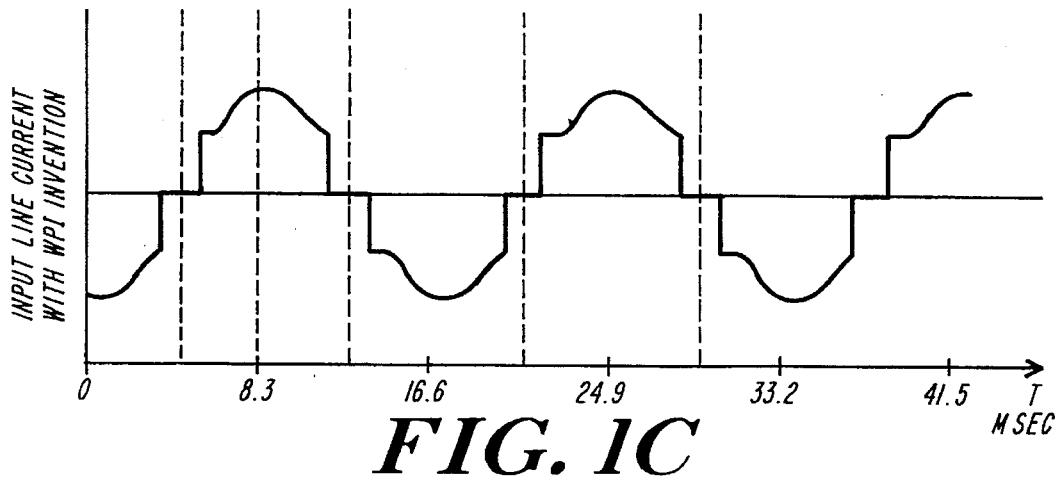

Accordingly, passive circuitry in the form of C5, D6, R26 and the first and second portions/winding(s) 26, 28 on the primary side 20 of the power transformer T1, and relationships therebetween facilitate power factor in excess of 0.95, as compared to 0.7 or less achieved with conventional input filter capacitors. With power factor correction implemented according to the invention, input line current conducts for a longer period of time and the input current waveform, as illustrated in FIG. 1C, looks more like the input line voltage.

Constant Current Limiting

Figure 7:
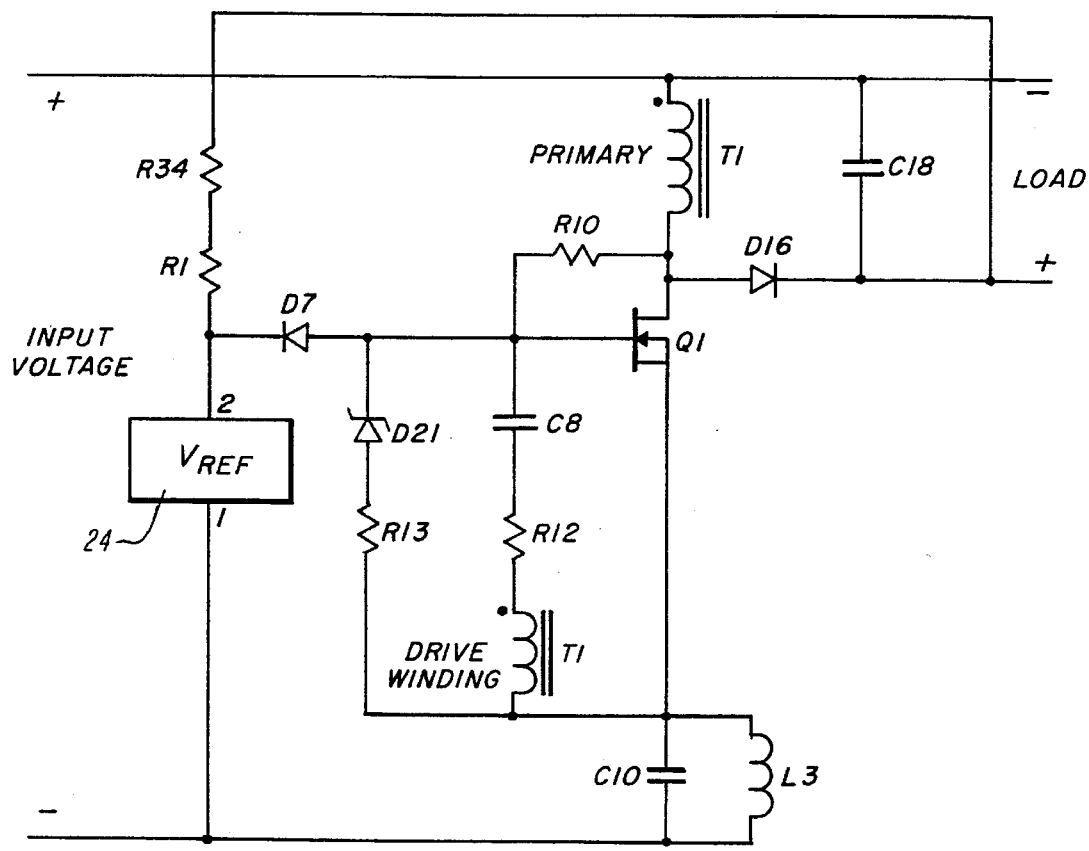
FIG. 7 is a schematic diagram of an alternative implementation of circuitry in the self-oscillating converter of FIG. 4A, which increases efficiency.

The implementation illustrated in FIG. 7 (and FIG. 5) includes constant current limiting circuitry that results in further increases in efficiency. Resistor Re that was implemented in the embodiment described with reference to FIG. 4A dissipates a significant amount of power, which lowers overall efficiency and increases the internal temperature of a supply or ballast. Resistor Re can be replaced with a capacitor inductor network C10/L3 without changing the functionality of the circuit. However, there is very low power dissipation in C10, which improves overall efficiency of the ballast. L3 is added to discharge the energy in C10 (note that C10 can not be a polarized capacitor in this implementation). In such a configuration the output power is determined by Vref and C10, and higher efficiency results due to low losses in C10 and L3.

It should be appreciated that various other features can be implemented with the circuitry according to the invention, including overtemperature protection, which might be implemented in a circuit such as illustrated in FIG. 5, by putting a negative temperature coefficient thermistor across D20 such that excessive temperatures in the circuit module cause the SCR Q3 to trigger during normal output voltage levels, turning off the supply to prevent component failures, etc.

While the self-starting, self-oscillating converter described herein includes an N channel depletion field effect transistor (FET) Q1, it will be appreciated by those of ordinary skill in the art that other switching means, including various other types of FETs and transistors, or the like can be implemented.

Although the invention is described with respect to an illustrative 115 V AC, 100 W high intensity discharge lamp ballast and certain voltages are specified with respect to such embodiment, it should be appreciated that the invention can be embodied in other power supplies, including but not limited to supplies having output wattages of up to 250 W, output voltages of up to 1 kVolt and input voltages of 90–280 V AC, single or triple phase, or inventive aspects described herein can be implemented in a direct current embodiment of 12–400 V DC. Further, it should be appreciated that particular voltages etc. will be a function of the particular embodiment.

Although the invention has been shown and described with respect to an illustrative embodiment thereof, it should be appreciated that various other changes, additions and omissions in the form and detail thereof may be made therein without departing from the spirit and scope of the invention.

What is claimed is:

1. A power system receiving an input signal including an alternating input line voltage and alternating input line current and having a filter and rectifier filtering and rectifying said alternating input line voltage and said alternating input line current to generate a filtered rectified signal, said power system processing said filtered rectified signal to provide a substantially constant power output to a load, said system comprising:

oscillator circuitry receiving said filtered rectified signal, said oscillator circuitry including a first charge device, a second charge device, a switching device and an inductive device having a primary portion and a drive portion, said primary portion including a first inductive portion and a second inductive portion, said first charging device storing energy from said filtered rectified signal and controlling said switching device to alternately turn said switching device on and off, with said switching device in an on state power output to said load is provided by said second charge device and with said switching device in an off state power output to said load is provided by said primary portion of said inductive device while said first charge device and said second charge device recharge; and power factor correction circuitry including a storage device (C5) providing energy to said oscillator circuitry during a portion of said alternating input line voltage, said storage device receiving energy during another portion of the alternating input line voltage in accordance with a ratio of windings of said first inductive portion and said second inductive portion of said primary portion of said inductive device, energy stored by said storage device and available to said oscillator circuitry is optimizable for a different range of said alternating input line voltage by adjusting said ratio of windings of said first inductive portion and said second inductive portion of said primary portion of said inductive device in accordance with said different range of said alternating input line voltage.

2. The power system of claim 1 further including power regulation circuitry comprising a voltage reference circuit sensing said alternating input line voltage, a voltage across said second charge device and a voltage that controls said switching device such that an increase in one of said alternating input line voltage and said voltage across said second charge device results in a lower current in said inductive device, and such that a decrease in one of said alternating input line voltage and said voltage across said second charge device results in a higher current in said inductive device, in a manner such that output power to said load is regulated to be substantially constant regardless of fluctuations in said input signal and changes in said load.

3. The power system of claim 2 wherein said voltage reference circuit includes a programmable zener diode.

4. The power system of claim 1 further including short circuit/overload protection circuitry comprising means for delaying charging of said first charging device to reduce a frequency of said switching device turning on and off which reduces frequency of oscillations of said oscillator circuitry.

5. The power system of claim 4 wherein said means for delaying includes components for setting a voltage across said first charge device at which said switching device is turned on.

6. The power system of claim 1 further including output open circuit voltage regulation circuitry comprising means for discharging said first charge device when said load is absent.

7. The power system of claim 6 wherein said means for discharging said first charge device includes an SCR.

8. The power system of claim 1 wherein charging of said storage device is limited to a value which eliminates need for protection against surges of said alternating line current when said alternating line voltage is first applied to said power system.

9. The power system of claim 1 wherein said storage device is charged to a voltage less than said filtered rectified signal in accordance with a ratio between said first inductive portion and said second inductive portion.

10. A high intensity discharge lamp power supply providing power to a high intensity discharge lamp, comprising:

an electromagnetic interference filter and rectifier portion receiving an alternating input signal from a power line and producing a filtered, rectified input signal;

discontinuous boost circuitry receiving said filtered, rectified input signal and generating output power to deliver to a load, said discontinuous boost circuitry including a self starting, self oscillating converter having a first charge device, a second charge device, a switching device and an inductive device with a primary portion and a drive portion, said primary portion including a first inductive portion and a second inductive portion, said first charging device storing energy from said filtered rectified input signal and controlling said switching device to alternately turn said switching device on and off to provide said output power to said load from said second charge device;

power factor correction circuitry including a storage device providing energy to said oscillating converter during a portion of said alternating input signal, said storage device receiving energy during another portion of the alternating input line current in accordance with a ratio of windings of said first inductive portion and said second inductive portion of said primary portion of said inductive device to effect said output power in the form of a power factor corrected oscillating converter output;

an output bridge receiving said power factor corrected oscillating converter output and producing a square wave output; and an ignitor receiving said square wave output and firing said high intensity discharge lamp.

11. The power system of claim 10 further including power regulation circuitry comprising a voltage reference circuit sensing said alternating input signal, a voltage across said second charge device and a voltage that controls said switching device such that an increase in one of said alternating input signal and said voltage across said second charge device results in a lower current in said inductive device, and such that a decrease in one of said alternating input signal and said voltage across said second charge device results in a higher current in said inductive device, in a manner such that output power to said load is regulated to be substantially constant regardless of fluctuations in said alternating input signal and changes in said load.

12. The power system of claim 11 wherein said voltage reference circuit includes a programmable zener diode.

13. The power system of claim 10 further including short circuit/overload protection circuitry comprising means for delaying charging of said first charging device to reduce a frequency of said switching device turning on and off which reduces frequency of oscillations of said self starting, self oscillating converter.

14. The power system of claim 13 wherein said means for delaying includes components for setting a voltage across said first charge device at which said switching device is turned on.

15. The power system of claim 10 further including output open circuit voltage regulation circuitry comprising means for discharging said first charge device when said load is absent.

16. The power system of claim 15 wherein said means for discharging said first charge device includes an SCR.

17. The power system of claim 10 wherein charging of said storage device is limited to a value which eliminates need for protection against current surges when said alternating input signal is first applied to said power system.

18. The power system of claim 10 wherein said storage device is charged to a voltage less than said filtered rectified input signal in accordance with a ratio between said first inductive portion and said second inductive portion.

* * * * *